R. B. DUTTON.
Sleigh.
No. 60,348.
Patented Dec. 11, 1866.
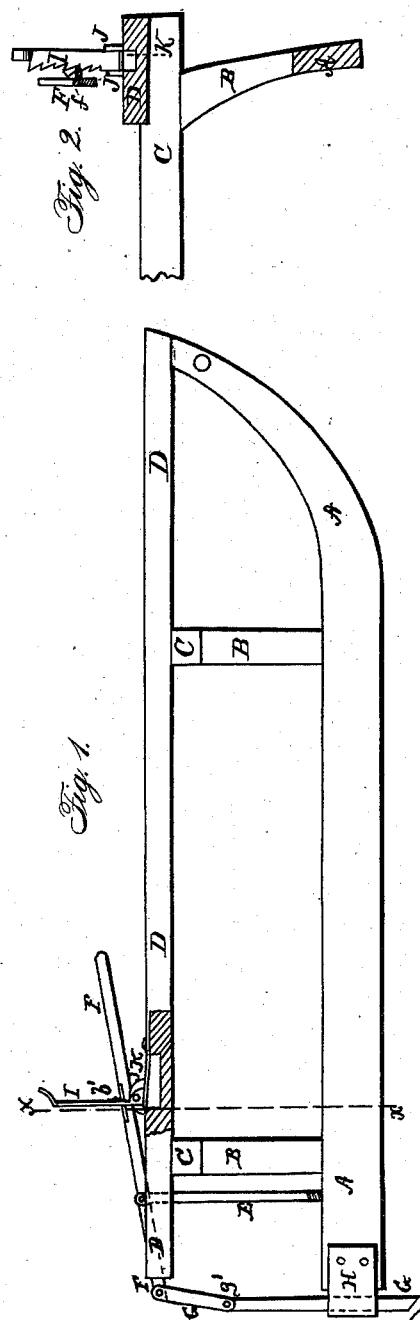
Witnesses:
Inventor:

United States Patent Office.

IMPROVEMENT IN SLED BRAKES.

R. B. DUTTON, OF IRON HILL, IOWA, ASSIGNOR TO HIMSELF AND N. C. WHITE, OF SAME PLACE.

Letters Patent No. 60,348, dated December 11, 1866.

The Schedule referred to in these Letters Patent and making part of the same.

TO ALL WHOM IT MAY CONCERN:

Be it known that I, R. B. DUTTON, of Iron Hill, in the county of Jackson, and State of Iowa, have invented a new and useful Improvement in Sled Brake; and I do hereby declare that the following is a full, clear, and exact description thereof, which will enable others skilled in the art to make and use the same, reference being had to the accompanying drawings, forming part of this specification, in which—

Figure 1 is a side view of a sled, with my improved brake attached, a part of the rave being broken away.
Figure 2 is a detail sectional view, taken through the line $x\ x$, fig. 1.

Similar letters of reference indicate like parts.

My invention has for its object to furnish an improved brake for attachment to sleds, and it consists in the combination and arrangement of the jointed dog, clasp, lever, fulcrum-rod, ratchet-bar, and spring with each other and with the rave and runner of the sled, as hereinafter more fully described.

A is the runner, B the knees, C the beams, and D the rave of the sled, about the construction and arrangement of which parts there is nothing new. E is the fulcrum-rod, which passes down through the rave D, and has a screw formed upon its lower end, by means of which it is screwed into the runner A. Upon the upper end of the rod E are formed ears, to which the lever F is pivoted by a bolt passing through the said ears and lever, as shown in fig. 1. The lever F extends back a little beyond the rear end of the rave D, and to its rear end is pivoted the upper end of the dog G. To the sides of the rear end of the runner A are attached the ends of a metallic strap or clasp H, which forms a socket for the reception of the dog G, as shown in fig. 1. The ends of the clasp H should be let into the sides of the runner A so that their outer surfaces may be flush with the sides of the runner. The dog G is of such a length that when the forward end of the lever F is raised the lower end of the said dog may project below the lower edge or face of the runner A, as shown in fig 1. The dog G is also jointed, as shown at the point $g'$, so that the lower part of said dog may work vertically in the clasp H, as it is operated by the lever F. I is a ratchet-bar, which is pivoted to ears J, attached to the upper surface of the rave D. The lower end of the ratchet-bar I is made square, and when the said bar is raised the said square end rests upon one end of the spring K, the other end of which is attached to the rave D, as shown in fig. 1. By this construction the ratchet-bar I may be turned down upon the upper side of the rave D when not in use, so as to be wholly out of the way. Upon the edge of the lever F is formed a flange $f'$, which enters the teeth of the ratchet-bar I and holds the lever F and dog G securely in any position in which they may be placed.

I claim as new, and desire to secure by Letters Patent—

The combination and arrangement of the jointed dog G, clasp H, lever F, fulcrum-rod E, ratchet-bar I, and spring K with each other, and with the rave D and runner A of the sled, the whole being constructed and operated substantially as herein described, and for the purpose set forth.

R. B. DUTTON.

Witnesses:
REZIN WILLISON,
HIRAM STICKLEY.